US009107178B2

(12) United States Patent
Sydir et al.

(10) Patent No.: US 9,107,178 B2
(45) Date of Patent: Aug. 11, 2015

(54) GEO-LOCATION SIGNAL FINGERPRINTING

(71) Applicant: INTEL CORPORATION, Santa Clara, CA (US)

(72) Inventors: Jaroslaw J. Sydir, San Jose, CA (US); Anthony G. LaMarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/726,364

(22) Filed: Dec. 24, 2012

(65) Prior Publication Data

US 2014/0179341 A1 Jun. 26, 2014

(51) Int. Cl.
| H04W 24/00 | (2009.01) |
| H04W 64/00 | (2009.01) |
| G01S 1/00 | (2006.01) |
| G01S 5/02 | (2010.01) |

(52) U.S. Cl.
CPC ............... *H04W 64/00* (2013.01); *G01S 1/00* (2013.01); *G01S 5/0242* (2013.01); *G01S 5/0252* (2013.01)

(58) Field of Classification Search
CPC ... H04W 64/00; H04W 4/02; H04M 1/72519; G01S 1/02
USPC .................. 455/456.6, 456.1, 550.1; 342/450
See application file for complete search history.

(56) References Cited

U.S. PATENT DOCUMENTS

| 2005/0037776 A1 | 2/2005 | Perez-Breva et al. |
| 2008/0046326 A1* | 2/2008 | Horstemeyer .................. 705/14 |
| 2009/0143078 A1* | 6/2009 | Tu et al. ..................... 455/456.3 |
| 2010/0153008 A1* | 6/2010 | Schwartz et al. ............. 701/207 |
| 2011/0054780 A1* | 3/2011 | Dhanani et al. ............... 701/204 |
| 2012/0083286 A1 | 4/2012 | Kim et al. |
| 2012/0170560 A1 | 7/2012 | Han et al. |
| 2012/0184286 A1* | 7/2012 | Richardson et al. ........ 455/456.1 |
| 2012/0184301 A1 | 7/2012 | Jovicic et al. |
| 2012/0200457 A1 | 8/2012 | Farrokhi et al. |
| 2013/0157683 A1* | 6/2013 | Lymberopoulos et al. 455/456.1 |

OTHER PUBLICATIONS

International Search Report and Written Opinion received for PCT Application No. PCT/US2013/047802, mailed on Oct. 22, 2013, 14 pages.

* cited by examiner

*Primary Examiner* — Danh Le
(74) *Attorney, Agent, or Firm* — Forefront IP Lawgroup, PLLC (57) ABSTRACT

Disclosed herein is a technology related to low-power, accurate location estimation for mobile devices (such as a smartphone). More particularly, the disclosed technology facilitates estimation of a physical or "real world" location (e.g., geo-location) without relying on the conventional always-on and battery-draining approaches of Global Positioning Systems (GPSs) or some form of telemetry based upon multiple radio signals (e.g., cellular). This Abstract is submitted with the understanding that it will not be used to interpret or limit the scope or meaning of the claims.

16 Claims, 8 Drawing Sheets

GEO-LOCATION SIGNAL FINGERPRINTING

BACKGROUND

The use of mobile devices, such as smartphones, is nearly ubiquitous. Many of these mobile devices include the capability to determine their geo-physical (e.g., geographic) location. That is, the mobile device is capable of determining its location in the real world. Conventionally, location determination is typically accomplished by using Global Positioning Systems (GPS), some form of telemetry based upon multiple radio signals (e.g., cellular), internet protocol (IP) geo-location, or some combination thereof.

A collection of so-called location-based services (LBSs) are emerging that take advantage of the location-awareness capability of the mobile devices that so many people are carrying with them each day. For example, LBSs include targeted advertising, social networking, locating friends ("check-ins"), photo-tagging, life-logging, location-based games, fitness monitoring, etc. LBS may include vehicle or parcel tracking as well.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein is a technology related to low-power, accurate location estimation for mobile devices (such as a smartphone). More particularly, the disclosed technology facilitates estimation of a physical or "real world" location (e.g., geo-location) without relying on the conventional always-on and battery-draining approaches of Global Positioning Systems (GPSs) or some form of telemetry based upon multiple radio signals (e.g., cellular). A geo-location is typically defined by geo-coordinates, such as latitude, longitude, and altitude. Using the technology described herein, a mobile device can find its geo-location without GPS or signal-based telemetry.

Location Awareness

Location awareness involves the mobile device determining its present location. Conventional location-determination approaches include GPS and signal-positioning or telemetry (e.g., triangulation, trilateration, and other forms of interpolation and extrapolation) to determine geo-location relative to multiple signal sources. GPS are near-ubiquitous outdoor location technology and a GPS enabled typical smartphone has three to five meter accuracy. For signal positioning, the signal sources can use cellular or a variant of IEEE 802.11 (i.e., Wi-Fi).

GPS is a system in which mobile devices locate themselves by measuring radio signal time-of-flight from a subset of the GPS satellites. GPS is characterized as fairly accurate (i.e., three to five meters with a clean signal), but GPS is notoriously power hungry. Typically, GPS draws 45-150 mw on most mobile devices.

Signal positioning (e.g., WiFi/cellular trilateration) is a conventional approach to wide-area location estimation and is now near ubiquitous on smartphones. WiFi/cellular trilateration relies on a database of IEEE 802.11 (i.e., Wi-Fi) access points and cellular tower locations, indexed by their media access card (MAC) address or tower ID. These databases are created by brute-force mapping efforts. Given such a database, a mobile device can scan for nearby towers and IEEE 802.11 access points (and their signal strength), look up their locations in the database and estimate where the device is physically located.

Signal-positioning systems are not as power hungry as GPS. However, conventional signal-positioning systems are much less accurate then GPS. These systems vary in accuracy from twenty to two-hundred meters based on the density of nearby towers and IEEE 802.11 access points.

Instead of the conventional location-awareness approaches, the technology described herein learns inherent observable characteristics of a particular location, associates that with the geo-location of that particular location, and stores that association in a database of such associations (e.g., a signal-fingerprint map). When a mobile device later observes the same inherent observable characteristics, it finds the geo-location that is associated with the just-observed characteristics in the signal-fingerprint map. With one or more implementations described herein, the inherent observable characteristics of a particular location are the "observed" ambient radio environment.

One or more implementations include, for example, a system that gathers crowd-sourced information from many mobile devices moving about the world. With that gathered information, the system recognizes and learns frequented discrete locations based on the "observed" ambient radio environment at those locations. In particular, the system recognizes and learns which ambient identifiable wireless ("IWS") sources are part of a topography within reception range at those discrete locations. A wireless access point (WAP) is a specific example of an ambient IWS source.

Signal Fingerprinting

One or more implementations of the technologies described herein utilize a signal fingerprinting approach to learn a specific location and recognize it again. One or more of the implementations described herein utilize a particular form of signal fingerprinting called WiFi-based positioning. It is more commonly called "WiFi fingerprinting." Generally, WiFi fingerprinting involves memorizing a location based upon the WAP "fingerprint" of "visible" WAPs and their observed signal strengths.

Conventionally, WiFi fingerprinting involves a detailed survey of the radio landscape in which the WAP identifications and observed signal-strengths are collected in a dense grid by sampling throughout the localization area. Each fingerprint is associated with the location at which it was observed. Once an area has had its fingerprint map created, a typical mobile device can perform a WiFi scan, perform a map lookup, and estimate its location within that area with a typical accuracy of one to three meters. WiFi fingerprinting techniques are low power, accurate and work with WiFi-enabled devices.

However, construction of a conventional WiFi fingerprint map is time consuming. Constructed in this conventional way, the WiFi fingerprint map is only useful for the area in which it was collected. Interpolation is not possible for more than a few meters beyond the mapped area. As a result, conventional WiFi fingerprinting is typically used only in houses and small buildings, but rarely or never deployed in large buildings, on campus-wide scale, and over a city.

Crowdsourced Fingerprint Map

The technology described herein utilizes a horde of participating mobile devices collectively contributing location and signal-fingerprint associations determined while traveling about. Over time, a crowdsourced signal-fingerprint map of the world (or at least as much of it as can be signal fingerprinted) will be created. Crowdsourcing involves a process of outsourcing tasks to a distributed group of people or devices. Unlike outsourcing, crowdsourcing typically is done by a seemingly undefined public (i.e., crowd) rather than a well-defined group.

A user can choose to participate with this map creation. For example, the user downloading a mobile application ("app") onto their mobile device (e.g., smartphone or tablet) may accomplish the choice to participate. A participating device may contribute to the map as the device moves about. In one or more implementations, participating devices commit to make active contributions for only a very small percentage of the time (e.g., 1%).

Example Scenarios

Figure 1:
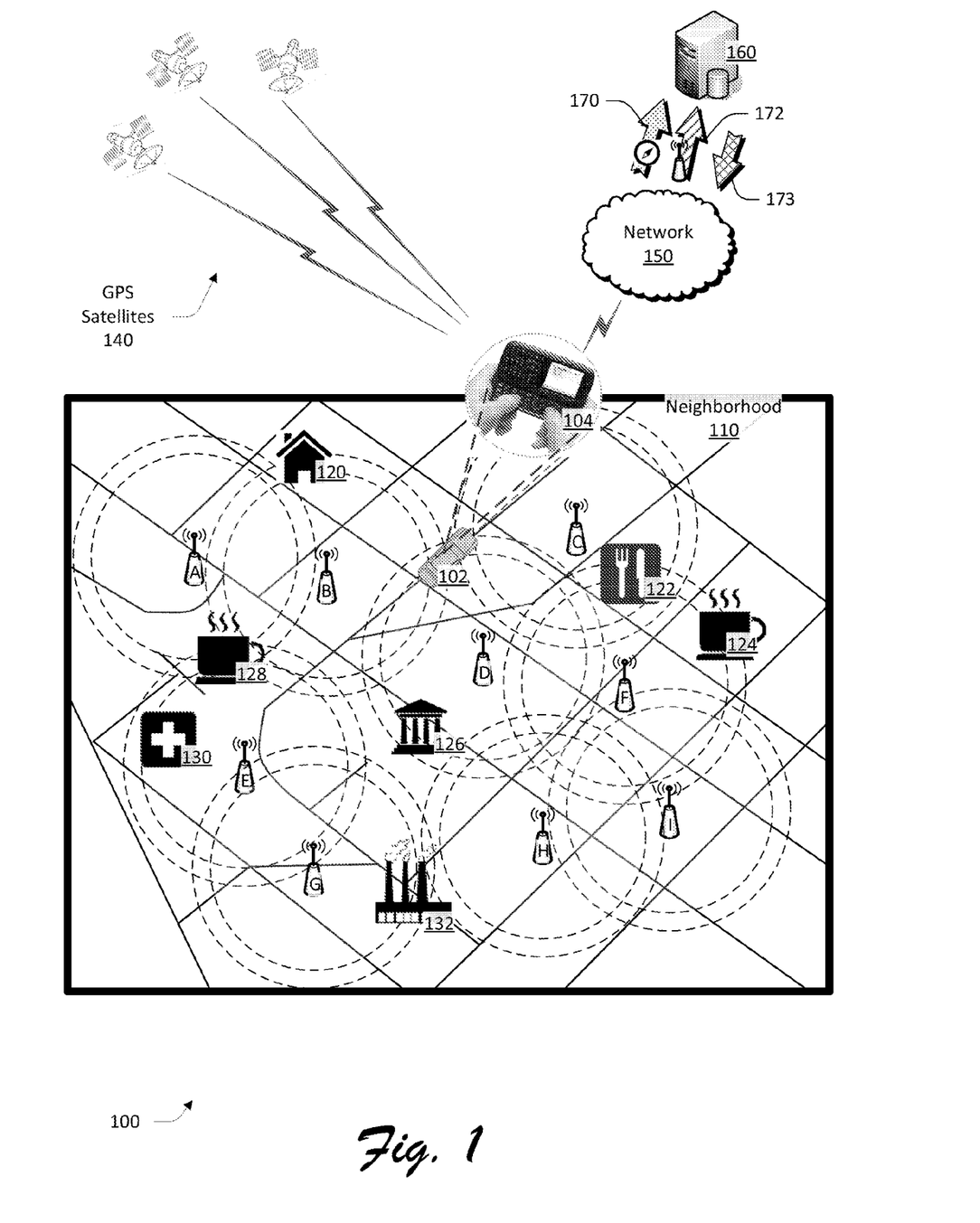
FIGS. 1 and 2 show example scenarios that illustrate an environment in which implementations in accordance with the description herein may operate.

FIG. 1 shows an example scenario 100 in which one or more implementations of the technology described here may be employed. The example scenario 100 illustrates contribution to the crowdsourced signal-fingerprint map.

For illustration purpose, the map 110 shows an automobile 102 on a road that has a driver or passenger (not shown) with an active wireless device 104. While the wireless device 104 is active, a user does not need to interact with it.

The map 110 also shows several points of interest (POIs). The POIs depicted in FIG. 1 include a home 120, a diner 122, a café 124 (i.e., coffee shop), a school 126, another café 128, a doctor's office 130, and a factory 132 (i.e., work). In addition, the map 110 shows many wireless access points (WAPs) distributed about the neighborhood. Each WAP is labeled with a capital letter ranging from A to I. A dashed double-lined circle indicates the range of each depicted WAP. While not shown as such in map 110, each POI depicted in FIG. 1 also contains one or more WAPs.

For example, with reference to map 110 of FIG. 1, presume that Dorothy is participating in the crowdsourced signal-fingerprint map project. While she is driving in her automobile 102, her mobile device 104 is actively contributing to the project. During this contribution time, the mobile device 104 gets a reading from the GPS satellites 140 to determine the geo-coordinates of its location. At the same location, the mobile device 104 gets one or more signal fingerprints of that location. The fingerprints may be obtained with a radio scan of ambient IWS sources and signal strength of such ambient IWS sources taken at the same time.

The mobile device 104 pairs the geo-coordinates readings and the signal-fingerprint readings of that location together. That is, the readings are associated with each other. The mobile device 104 uploads these paired readings to one or more network database servers 160 via a communications network 150 (such a cellular data network, a WAP, and/or the Internet). A geo-coordinate arrow 170 pointing towards the one or more network database servers 160 indicates the uploading of the geo-coordinates readings. Similarly, a signal-fingerprint arrow 172 pointing towards the one or more network database servers 160 indicates the uploading of the signal-fingerprint readings. Finally, a mapping request arrow 173 pointing from the one or more network servers 160 indicates requests that the network database servers 160 can make of the mobile device 104 to map the specific area where it is currently operating. In some implementations, the network database servers 160 can request a mobile device 104 to upload pairings from its current location in order to fill in holes in the fingerprint database.

More generally, the one or more network database servers 160 may be collectively described as "the cloud." The cloud is a generic label for remote services offered over a computer network (e.g., the Internet) that entrusts a user's data, software, and/or computation. Alternatively, the one or more network database servers 160 may be collectively described a user-contributor cloud service.

With a multitude of uploaded contributions from many instances and many people, the user-contributor cloud service constructs a single, giant signal-fingerprint map or alternative several regional signal-fingerprint maps.

Figure 2:
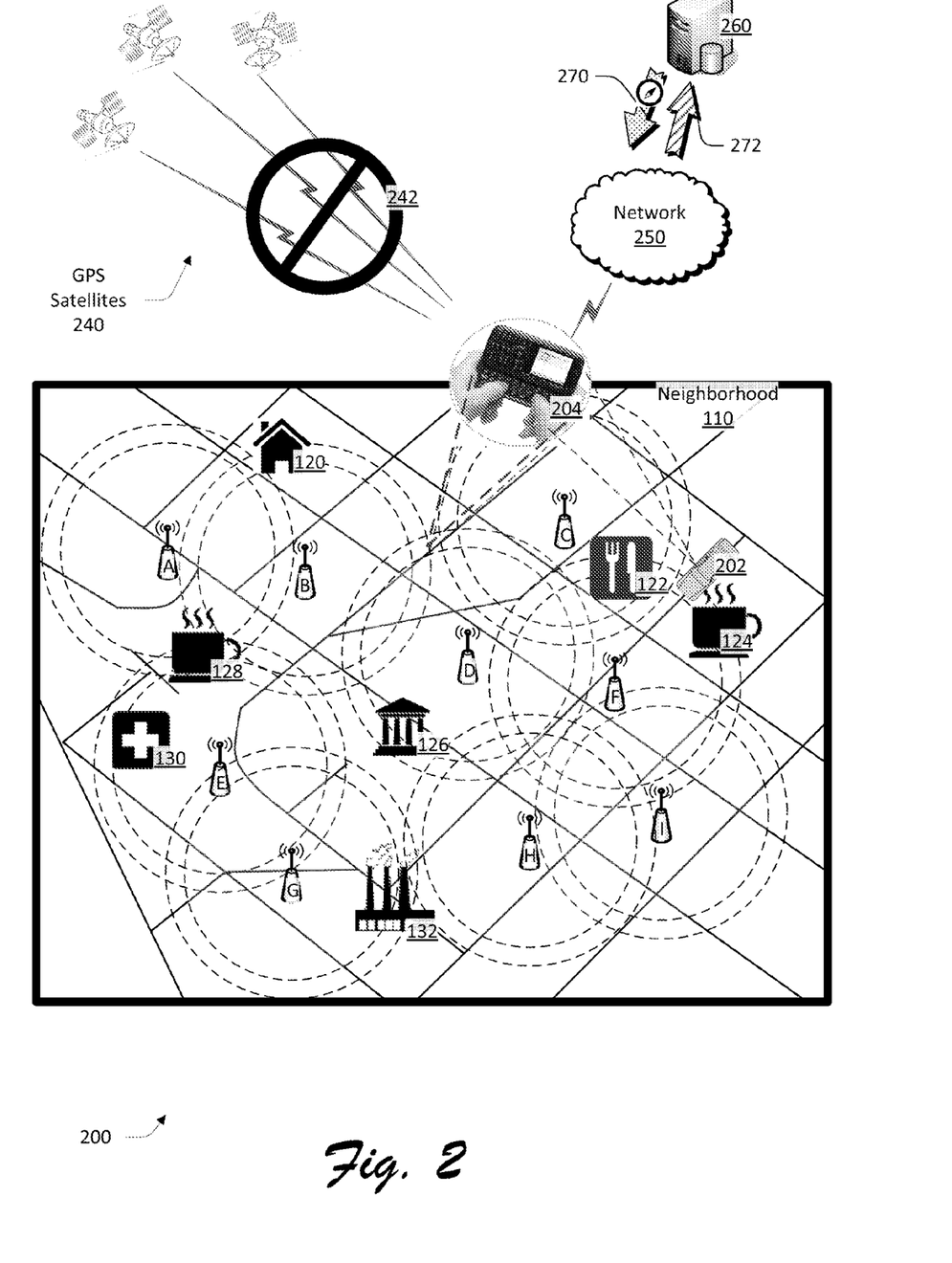

FIG. 2 shows an example scenario 200 in which one or more implementations of the technology described here may be employed. The example scenario 200 illustrates location estimation based upon the crowdsourced signal-fingerprint map.

Except for an automobile 202 and a mobile device 204, all of the other items depicted in example scenario 100 are the same in this example scenario 200. The mobile device 204 may be the same as or different from the mobile device 104.

For example, with reference to map 110 of FIG. 2, presume that Isabel is participating in the crowdsourced signal-fingerprint map project. While she is driving in her automobile 202, her mobile device 204 is actively determining its present location.

As indicated by the No symbol 242, the mobile device 204 does not use GPS to determine is geo-location. Rather, the mobile device 204 pulls down relevant portion of the crowdsourced signal-fingerprint map from the cloud service. A relevant portion may be based upon some designated city, town, neighborhood, region, or area. Alternatively, it may be based upon recognition of ambient IWS sources near the mobile device 204.

The mobile device 104 gets one or signal fingerprints of its present location. The fingerprints may be obtained with a radio scan of ambient IWS sources and signal strength of such ambient IWS sources taken at the same time.

Using the crowdsourced signal-fingerprint map (or a portion thereof), the mobile device 104 estimates its location based on the one or signal fingerprints of its present location.

As shown in FIG. 2, a geo-coordinate arrow 270 pointing away from the one or more network database servers 160 indicates the downloading of the geo-coordinates readings. More generally, it may represent a downloading of the crowdsourced signal-fingerprint map (or a portion thereof). Conversely, an arrow 272 pointing towards the one or more network database servers 160 indicates the mobile device 204 requesting specific geo-coordinates readings or portions of the crowdsourced signal-fingerprint map. The request may include some form of some location identifying information, such as a nearby signal fingerprint, nearby ambient IWS source, and/or a designation of the present city, town, neighborhood, region, or area.

Example System

Figure 3:
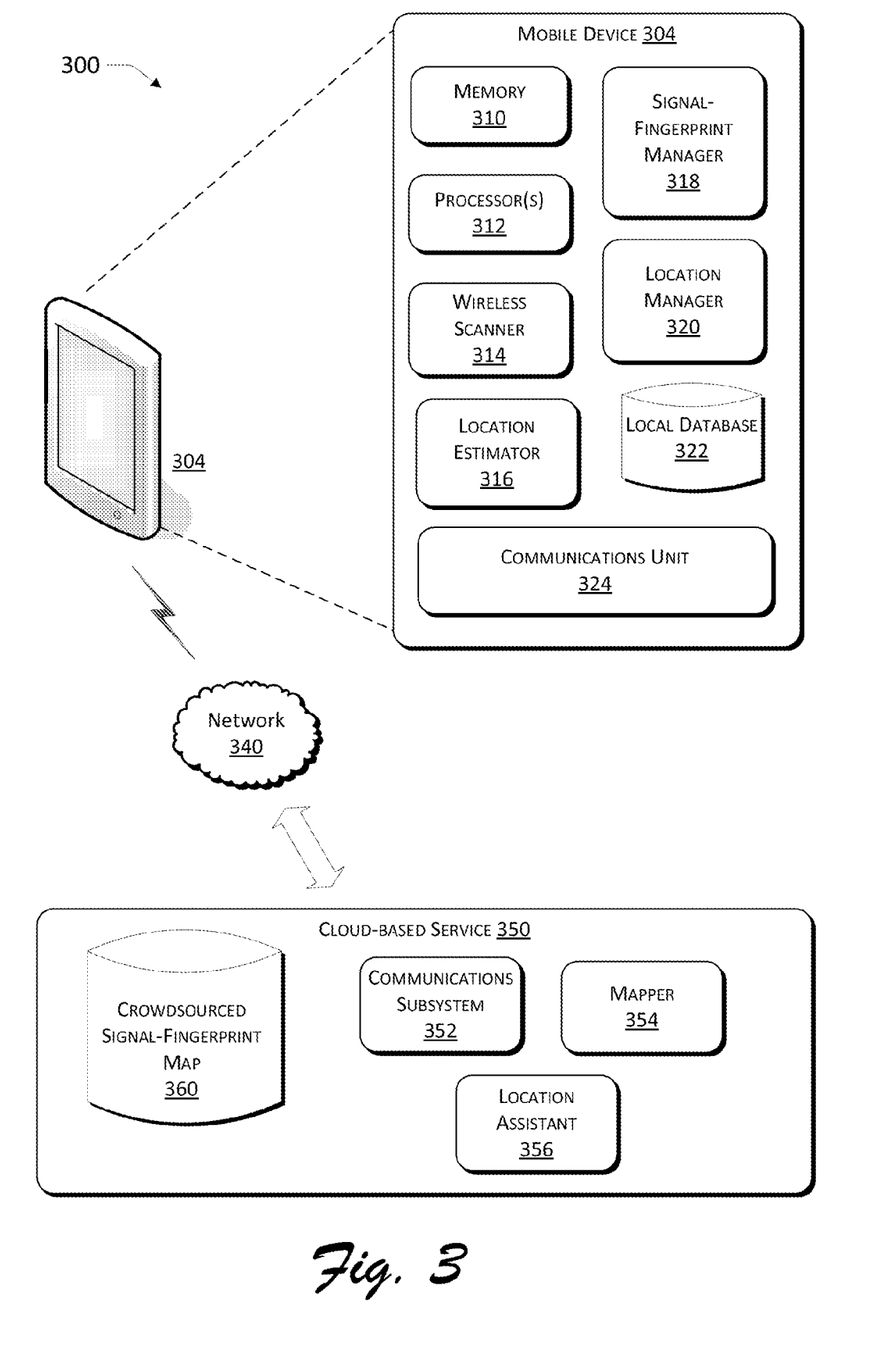
FIG. 3 illustrates an example system in accordance with one or more implementations described herein.

FIG. 3 illustrates example system 300 for implementing the technology described herein. The system 300 includes the mobile device 304 (such as a tablet computer), a network 340, and cloud service 350.

As depicted, the mobile device 304 includes a memory 310, one or more processor(s) 312, a wireless scanner 314, a location estimator 316, a signal-fingerprint manager 318, a location manager 320, a local database 322, and a communications unit 324. These functional components may be separate or some combination of hardware units. Alternatively, the components may be implemented, at least in part, in software and thus be stored in the memory 310 and executed by the processors 312.

The wireless scanner 314 periodically scans for ambient IWS sources. The scanner 314 helps identify the encountered ambient IWS sources and store them in the memory 310. When it observes an ambient IWS source, the wireless scanner 314 detects that ambient IWS source and identifies its unique identification (e.g., BSSID, MAC address, semantic name of "Home," etc.).

The location estimator 316 calculates the geo-physical or "real world" location of the mobile device 304. The location estimator 316 uses location awareness technology, such as GPS.

Rather than calculate the geo-physical or "real world" location, the signal-fingerprint manager 318 relies upon an observation of the surrounding characteristic of a particular location to sufficiently distinguish it from other locations. In some implementations, the signal-fingerprint manager 318 generates one or more signal fingerprints based upon the ambient IWS sources. In some implementations, the scanner 314 and signal-fingerprint manager 318 are the same component.

The location manager 320 creates an association between the estimated location and the one or more signal fingerprints. The location manager 320 stores those associations in the local database 322. In addition or in the alternative, the location manager 320 sends those associations to a remote computing system, such as the cloud-based service 350. The cloud-based service 350 updates the crowdsourced signal-fingerprint map 360 based upon the new associations.

The local database 322 may be included in memory 310 or be its own separate storage system. The local database 322 is a local version of a crowdsourced signal-fingerprint map 360 or a portion thereof.

The communications unit 324 uploads the location-fingerprint pairings to the cloud-based service 350 via the network 340. Alternatively or additionally, the communications unit 324 may upload updated versions of its local version of the map to the cloud-based service 350.

Although not shown, the mobile device 304 also includes a graphics subsystem, an audio subsystem, and a user input subsystem. The graphics subsystem is designed to display, in a user-interface, the present location as determined by the technologies described herein. The user input subsystem is designed to receive input from a user as needed.

The network 340 may be a wired and/or wireless network. It may include the Internet infrastructure and it may be presented as the so-called "cloud." The network 340 may include wired or wireless local area network, a cellular network, and/or the like. The network 340 links the mobile device 304 with one or more network servers or cloud-based service 350.

The cloud-based service 350 includes a communications subsystem 352, a mapper 354, a location assistant 356, and the crowdsourced signal-fingerprint map 360. The cloud-based service 350 need not be part of the so-called "cloud." Rather, it may be described as one or more network servers or more simply as a computing system.

The communications subsystem 352 receives a multitude of pairings of a geo-location with a signal fingerprint about its paired geo-location. While only one mobile device (which is device 304) is shown in FIG. 3, in reality the communications subsystem 352 receives the multitude of pairings from a horde of mobile devices.

The mapper 354 maps the signal fingerprints to their paired geo-locations of a crowdsourced signal-fingerprint map. That is, the mapper 354 updates the crowdsourced signal-fingerprint map based upon the received multitude of location/fingerprint pairings.

The location assistant 356 responds to requests from the mobile devices to access information in the crowdsourced signal-fingerprint map 360. For example, the location assistant 356 may download a portion of the crowdsourced signal-fingerprint map 360 to a device. The location assistant 356 may help a device in finding of a location associated with the one or more matching signal fingerprints in the crowdsourced signal-fingerprint map 360.

The crowdsourced signal-fingerprint map 360 is a database of a multitude of pairings of a geo-location with a signal fingerprint about its paired geo-location. It is crowdsourced because the contents of the map/database are derived from a large horde or crowd of devices. Herein, the crowdsourced signal-fingerprint map 360 may be called a location-fingerprint database.

Location-Fingerprint Mapping Operations

Figure 4:
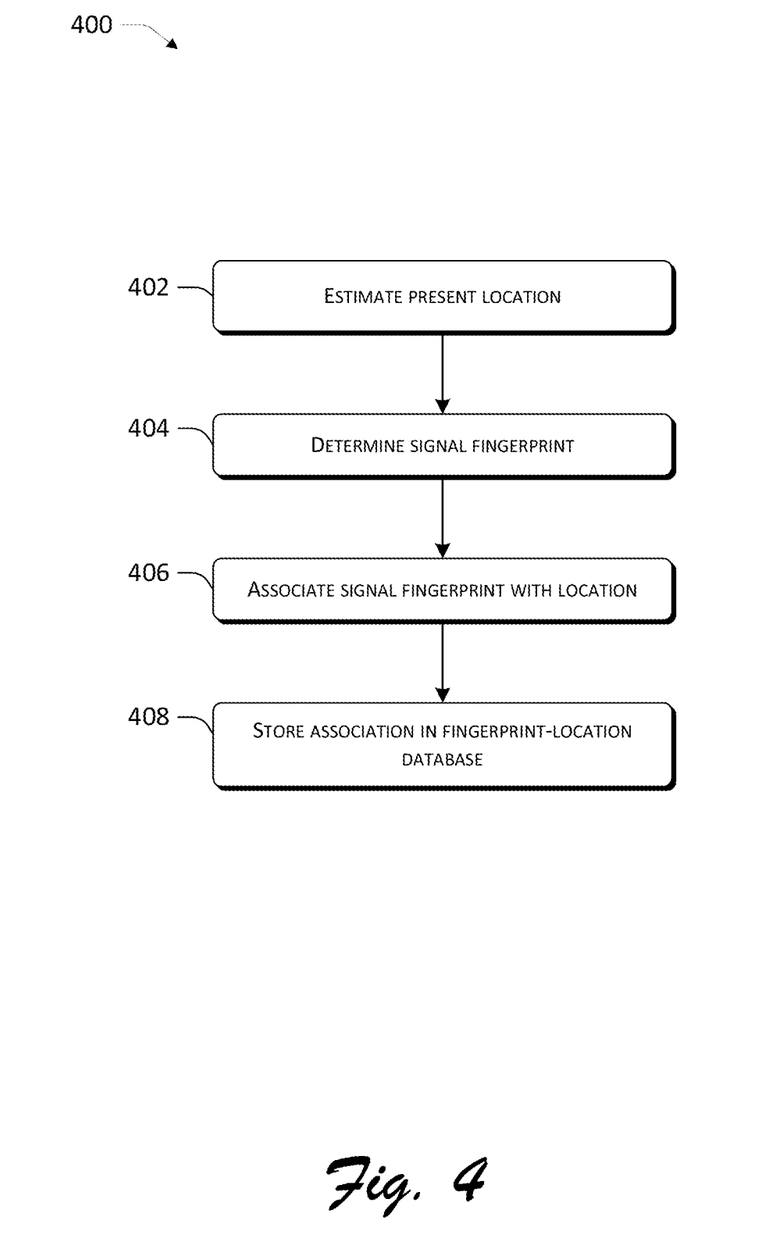
FIGS. 4-6 illustrate processes in accordance with one or more implementations described herein.

FIG. 4 illustrates an example process 400 for implementing, at least in part, the technology described herein. In particular, process 400 depicts gathering of a location-fingerprint pairing by a mobile device. The newly gathered pairing may be used to updating a location-fingerprint map. Examples of such a mobile device include mobile devices 104, 204, and 304.

At 402, the mobile device estimates a present location of the mobile device. In particular, it estimates a geo-location using a location awareness technology, such as GPS.

At 404, the mobile device determines the observable inherent characteristics about that present location. To that end, the mobile device determines one or more signal fingerprints about the device. As part of doing that, the mobile device observes one or more ambient IWS sources. The determined one or more signal fingerprints are based at least in part upon one or more of the observed ambient IWS sources.

At 406, the mobile device associates the one or more signal fingerprints with the estimated location.

At 408, the mobile device sends that association between the one or more signal fingerprints and the estimated location into a location-fingerprint database at a cloud-based service. Alternatively or additionally, the mobile device may store that association at a local version of the location-fingerprint database in the device's memory.

The entire process 400 may be triggered from time to time. The mobile device detects a change in location. The device or cloud-based service determines whether that change warrants triggering the process 400. If so, then process is performed.

Examples of triggers that might warrant performing process 400 include an arbitrary choice (e.g., five randomly selected minutes per day) and a determination that the new location is one that is under mapped or a request by the cloud-based service 350 to gather pairings at the current location.

Location-Fingerprint Mapping Operations

Figure 5:
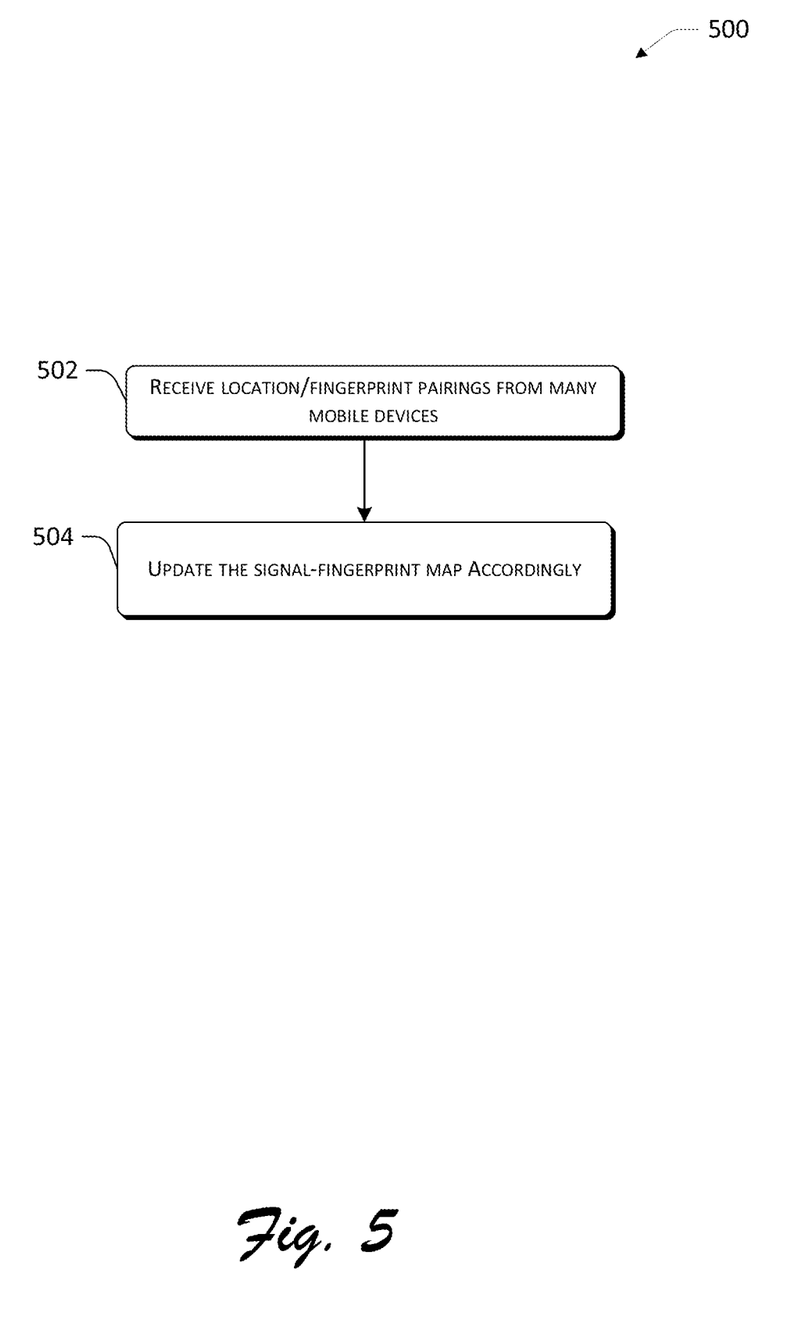

FIG. 5 illustrates an example process 500 for implementing, at least in part, the technology described herein. In particular, process 500 depicts the generation and update of a crowdsourced location-fingerprint map based upon a multitude of location-fingerprint pairing from a horde of mobile devices. Examples of such mobile devices include mobile devices 104, 204, and 304. The process 500 may be performed by one or network servers or by a cloud-based service (e.g., service 350).

At 502, the cloud-based service receives a multitude of pairings of a geo-location with a signal fingerprint about its paired geo-location. A horde of mobile devices sends the multitude of pairings to the cloud-based service. The terms multitude and horde are intended to infer that very large numbers are involved here. Not just tens, hundreds, or thousands. But much more than that.

At 504, the cloud-based service maps the signal fingerprints to their paired geo-locations of a crowdsourced signal-fingerprint map. That is, the cloud-based service updates the crowdsourced signal-fingerprint map based upon the received multitude of location/fingerprint pairings.

Operations of Location Estimation Based Upon a Location-Fingerprint Map

Figure 6:
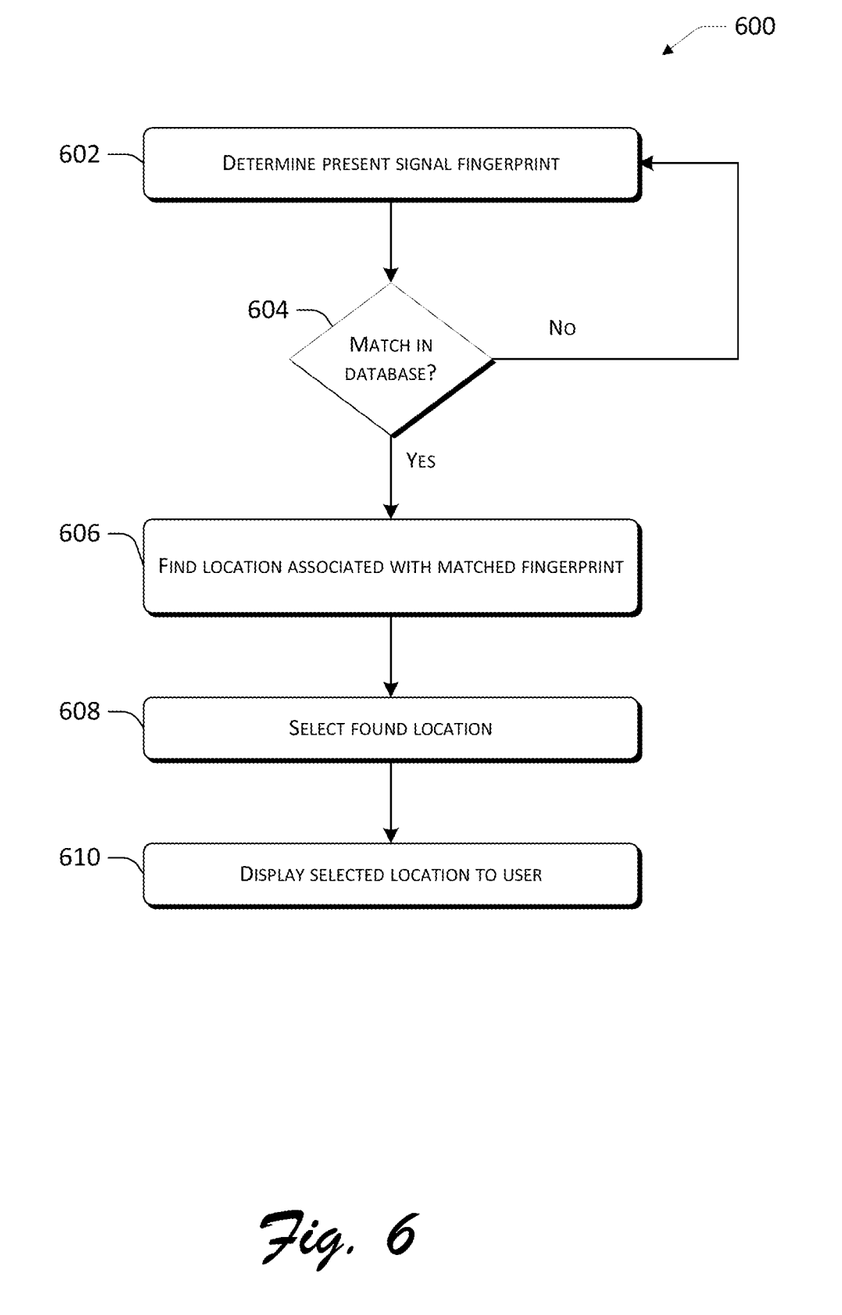

FIG. 6 illustrates an example process 600 for implementing, at least in part, the technology described herein. In particular, process 600 depicts the generation and update of a crowdsourced location-fingerprint map based upon a multitude of location-fingerprint pairing from a horde of mobile devices. Examples of such mobile devices include mobile devices 104, 204, and 304.

At 602, the mobile device determines the observable inherent characteristics about its present location. To that end, the mobile device determines one or more signal fingerprints at its current location. As part of doing that, the mobile device observes one or more ambient IWS sources. The determined one or more signal fingerprints are based at least in part upon one or more of the observed ambient IWS sources.

At 604, the mobile device matches the one or more present signal fingerprints with one or more fingerprints stored in a location-fingerprint database.

At 606, the mobile device finds a location associated with the one or more matching signal fingerprints in the location-fingerprint database.

With 604 and 606, the mobile device accesses the location-fingerprint database. That database, or a portion thereof, may be cached into the local memory of the device. Additionally or alternatively, the database may be stored on a remote computing system, such as is used with a cloud-based service.

At 606, the mobile device selects the found location as the present location.

At 608, the mobile device performs one or more actions based upon the present location. That action may be simply to present the location to the user via a user interface (e.g., display and audio). Using a user interface (UI) on the device, a user may configure an action to be performed. An action may include a trigger (e.g., three minutes from a particular destination), automatic actions to be performed (e.g., sending a text message), and objects of such action (e.g., recipient of such a text message). Examples of other actions include sending an email, launching an application or program, providing the current location to a running application or system component through an API, enable a system function, or other so-called geo-fencing actions.

Example Computing Device

Figure 7:
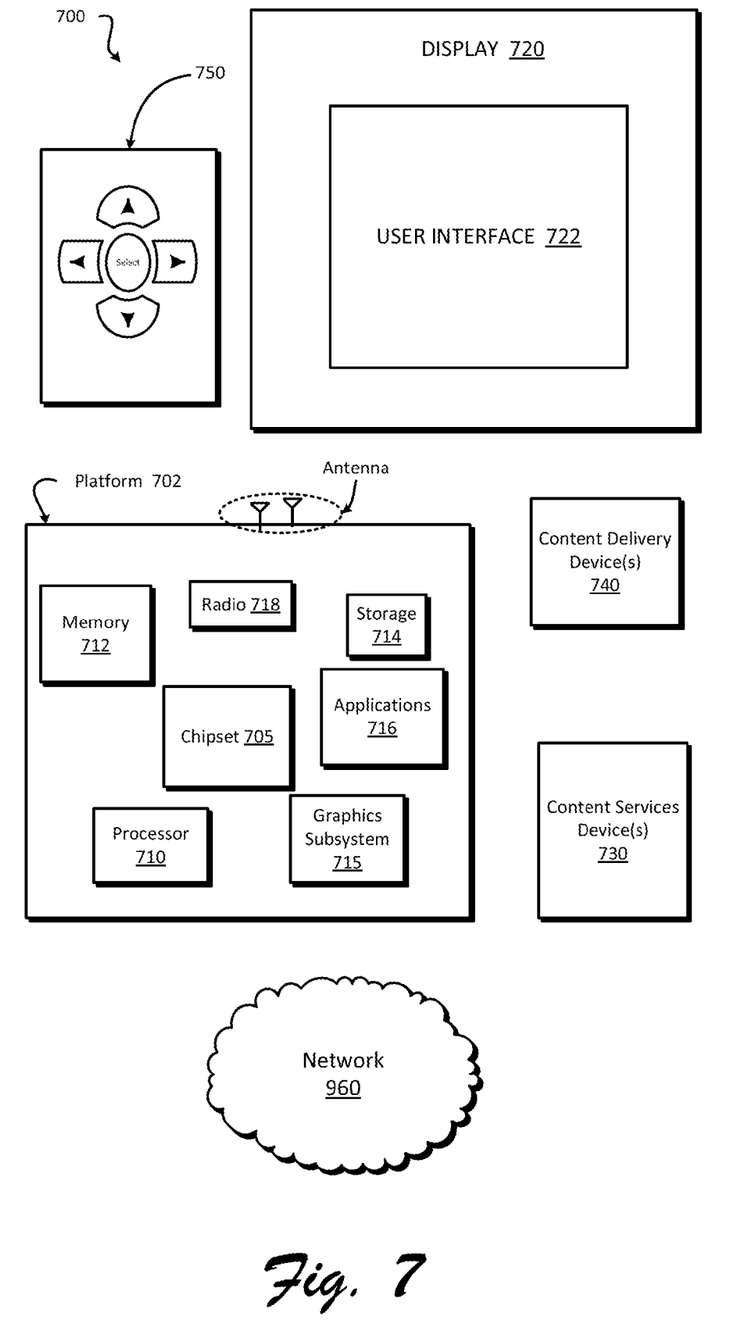
FIG. 7 illustrates an example computing device to implement in accordance with the technologies described herein.

FIG. 7 illustrates an example system 700 that may implement, at least in part, the technologies described herein. In various implementations, system 700 is a media system, although system 700 is not limited to this context. For example, system 700 can be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

In various implementations, system 700 includes a platform 702 coupled to a display 720. Platform 702 receives content from devices such as content services device 730, content delivery device 740, or other similar content sources. A navigation controller 750 including one or more navigation features may be used to interact with, for example, platform 702 and/or display 720.

In various implementations, platform 702 includes any combination of a chipset 705, a processor 710, memory 712, storage 714, a graphics subsystem 715, applications 716 and/or radio 718. Chipset 705 provides intercommunication among processor 710, memory 712, storage 714, graphics subsystem 715, application 716, and/or radio 718. For example, chipset 705 can include a storage adapter (not depicted) capable of providing intercommunication with storage 714.

Processor 710 may be implemented as a complex instruction set computer (CISC) or reduced instruction set computer (RISC) processors, x86 instruction set compatible processors, multicore, or any other microprocessor or central processing unit (CPU). In various implementations, processor 710 may be dual-core processors, dual-core mobile processors, and so forth.

Memory 712 may be implemented as a volatile memory device such as, but not limited to, a random access memory (RAM), dynamic random access memory (DRAM), or static RAM (SRAM).

Storage 714 may be implemented as a nonvolatile storage device such as, but not limited to, a magnetic disk drive, optical disk drive, tape drive, an internal storage device, an attached storage device, flash memory, battery backed-up synchronous DRAM (SDRAM), and/or a network accessible storage device. In various implementations storage 714 includes technology to increase the storage performance-enhanced protection for valuable digital media when multiple hard drives are included.

Graphics subsystem 715 processes of images such as still or video for display. Graphics subsystem 715 can be a graphics processing unit (GPU) or a visual processing unit (VPU), for example. An analog or digital interface may be used to communicatively couple the graphics subsystem 715 and the display 720. For example, the interface can be a high-definition multimedia interface, display port, wireless high definition media interface (HDMI), and/or wireless HD-compliant techniques. Graphics subsystem 715 may be integrated into processor 710 or chipset 705. In some implementations graphics subsystem 715 may be a stand-alone card communicatively coupled to chipset 705.

The graphics and/or video processing techniques described herein are implemented in various hardware architectures. For example, graphics and/or video functionality may be integrated within a chipset. Alternatively, a discrete graphics and/or a video processor may be used. As still another implementation, the graphics and/or video functions may be provided by a general-purpose processor, including a multicore processor. In further embodiments, the functions may be implemented in a consumer electronics device.

Radio 718 may include one or more radios capable of transmitting and receiving signals using various suitable wireless communications techniques. Such techniques involve communications across one or more wireless networks. Example wireless networks include, but are not limited to, wireless local area networks (WLANs), wireless personal area networks (WPANs), wireless metropolitan area network (WMANs), cellular networks, and satellite networks. In communicating across such networks, radio 718 operates in accordance with one or more applicable standards in any version.

In various implementations, display 720 includes any television-type monitor or display. Display 720 may include, for example, a computer display screen, touch-screen display, video monitor, television-like device, and/or a television. Display 720 can be digital and/or analog. In various implementations, display 720 may be a holographic display. In addition, display 720 may be a transparent surface that receives a visual projection. Such projections convey various forms of information, images, and/or objects. For example, such projections may be a visual overlay for a mobile augmented reality (MAR) application. Under the control of one or more software applications 716, platform 702 can display user interface 722 on display 720.

In various implementations, content services device(s) 730 may be hosted by any national, international, and/or independent service and thus accessible to platform 702 via the Internet. Content services device(s) 730 may be coupled to platform 702 and/or to display 720. Platform 702 and/or content services device(s) 730 may be coupled to a network 760 to communicate media information to and from the network 760. Content delivery device(s) 740 also may be coupled to platform 702 and/or to display 720.

In various implementations, content services device(s) 730 include a cable television box, personal computer, network, telephone, Internet-enabled devices, appliances capable of delivering digital information and/or content, and any other similar device capable of unidirectionally or bidirectionally communicating content between content providers and platform 702 and/display 720, via network 760 or directly. The content can be communicated unidirectionally and/or bidirectionally to and from any one of the components in system 700 and a content provider via a network 760. Examples of content include any media information including, for example, video, music, medical and gaming information, and so forth.

Content services device(s) 730 receive content such as cable television programming including media information, digital information, and/or other content. Examples of content providers include any cable or satellite television or radio or Internet content providers. The provided examples are not meant to limit implementations in accordance with the present disclosure in any way.

In various implementations platform 702 may receive control signals from navigation controller 750 having one or more navigation features. The navigation features of controller 750 may be used to interact with user interface 722, for example. In some embodiments, navigation controller 750 may be a pointing device such as a computer hardware component, specifically a human interface device, that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 can be replicated on a display (e.g., display 720) by movements of a pointer, cursor, focus ring, or other visual indicators displayed on the display. For example, under the control of software applications 716, the navigation features located on navigation controller 750 can be mapped to virtual navigation features displayed on user interface 722. In some embodiments, controller 750 may not be a separate component but may be integrated into platform 702 and/or display 720. The present disclosure, however, is not limited to the elements or in the context shown or described herein.

In various implementations, drivers (not shown) include technology to enable users to instantly turn on and off platform 702 like a television with the touch of a button after initial boot up, when enabled. Program logic allows platform 702 to stream content to media adaptors or other content services device(s) 730 or content delivery device(s) 740 even when the platform is turned off. In addition, chipset 705 includes hardware and/or software support for 5.1 surround sound audio and/or high definition 5.1 surround sound audio, for example. Drivers may include a graphics driver for integrated graphics platforms. In some embodiments the graphics driver may comprise a peripheral component interconnect (PCI) express graphics card.

In various implementations any one or more of the components shown in system 700 can be integrated. For example, platform 702 and content services device(s) 730 can be integrated, or platform 702 and content delivery device(s) 740 can be integrated, or platform 702, content services device(s) 730, and content delivery device(s) 740 can be integrated. In various embodiments, platform 702 and display 720 can be an integrated unit. Display 720 and content service device(s) 730 can be integrated, or display 720 and content delivery device (s) 740 can be integrated. These examples are not meant to limit the present disclosure.

In various embodiments system 700 can be implemented as a wireless system, a wired system, or a combination of both. When implemented as a wireless system, system 700 can include components and interfaces suitable for communicating over a wireless shared media, such as one or more antennae, transmitters, receivers, transceivers, amplifiers, filters, control logic, and so forth. An example of wireless shared media includes portions of a wireless spectrum, such as the RF spectrum. When implemented as a wired system, system 700 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media can include a wire, cable, metal leads, printed circuit board (PCB), backplane, switch fabric, semiconductor material, twisted-pair wire, coaxial cable, fiber optics, and others.

Platform 702 can establish one or more logical or physical channels to communicate information. The information includes media information and control information. Media information refers to any data representing content meant for a user. Examples of content include data from a voice conversation, videoconference, streaming video, electronic mail ("e-mail") message, voice-mail message, alphanumeric symbols, graphics, image, video, text, and so on. Data from a voice conversation can be, for instance, speech information, silence periods, background noise, comfort noise, tones, and other similar items. Control information refers to any data representing commands, instructions, or control words meant for an automated system. For example, control information can be used to route media information through a system, or instruct a node to process the media information in a predetermined manner. The embodiments, however, are not limited to the elements or in the context shown or described in FIG. 7.

As described above, system 700 can be embodied in varying physical styles or form factors. FIG. 7 illustrates implementations of a small form-factor device 700 in which system 700 can be embodied. In embodiments, for example, device 700 can be implemented as a mobile computing device having wireless capabilities. A mobile computing device may refer to any device having a processing system and a mobile power source or supply, such as one or more batteries.

Examples of a mobile computing device, in addition to those already mentioned, also may include computers that are arranged to be worn by a person, such as a wrist computer, finger computer, ring computer, eyeglass computer, belt-clip computer, arm-band computer, shoe computers, clothing computers, and other wearable computers. In various embodiments, a mobile computing device can be implemented as a smart phone capable of executing computer applications, as well as voice communications and/or data communications. Although some embodiments can be described with a mobile computing device, other embodiments can be implemented using other wireless mobile computing devices as well. The embodiments are not limited in this context.

Figure 8:
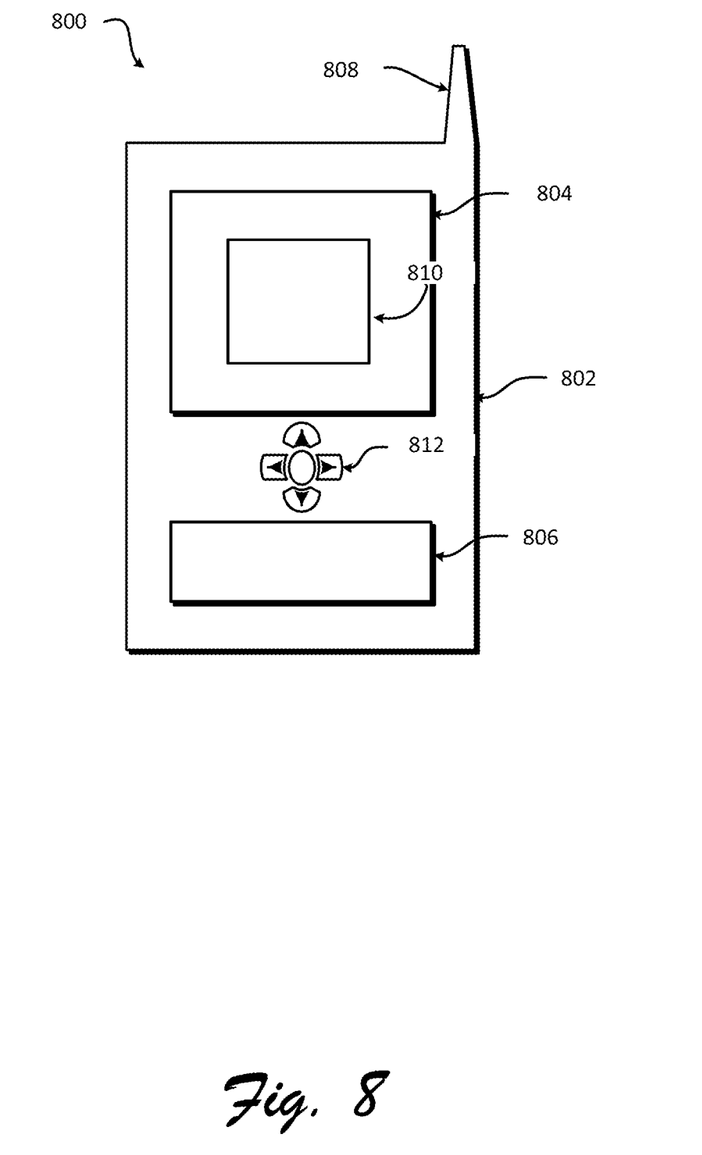
FIG. 8 illustrates an example device to implement in accordance with the technologies described herein.

As shown in FIG. 8, device 800 includes a housing 802, a display 804, an I/O device 806, and an antenna 808. Device 800 also includes navigation features 812. Display 804 includes any suitable display unit for displaying information appropriate for a mobile computing device. I/O device 806 includes any suitable I/O device for entering information into a mobile computing device. Examples for I/O device 806 include an alphanumeric keyboard, a numeric keypad, a touch pad, input keys, buttons, switches, rocker switches, microphones, speakers, voice recognition device and software, and others. Information also can be entered into device 800 by way of microphone (not shown). Such information is digitized by a voice recognition device (not shown). The embodiments are not limited in this context.

Various embodiments can be implemented using hardware elements, software elements, or a combination of both. Examples of hardware elements include processors, microprocessors, circuits, circuit elements (e.g., transistors, resistors, capacitors, inductors, etc.), integrated circuits, application specific integrated circuits (ASIC), programmable logic devices (PLD), digital signal processors (DSP), field programmable gate array (FPGA), logic gates, registers, semiconductor device, chips, microchips, chip sets, and more. Examples of software include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements varies in accordance with any number of factors, such as desired computational rate, power levels, heat tolerances, processing cycle budget, input data rates, output data rates, memory resources, data bus speeds, and other design or performance constraints.

One or more aspects of at least one embodiment can be implemented by representative instructions stored on a machine-readable medium that represents various logic within the processor, which when read by a machine causes the machine to fabricate logic to perform the techniques described herein. Such representations, known as "IP cores" can be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are demonstrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Additional and Alternative Implementation Notes

As used herein, a mobile device may be called a wireless device, portable device, handset, handheld device, or the like. In general, a mobile device is a small, hand-held, portable computing device that typically has a display screen and some user input mechanism (e.g., touch screen or keyboard). Often they weigh less than two pounds. Often, they are equipped with wireless communications capabilities, such as Wi-Fi, Bluetooth, and cellular. Examples of implementations of a mobile device include a smartphone, a tablet computer, a feature phone, a personal digital assistant (PDA), a wireless-enabled wearable device, a laptop computer, netbook computer, handheld device, handset, and portable computer.

As used herein, WiFi refers to wireless signals based upon the IEEE 802.11 set of standards for implementing wireless local area network (WLAN) computer communication in the 2.4, 3.6 and 5 GHz frequency bands. These standards are created and maintained by the IEEE LAN/MAN Standards Committee (IEEE 802).

Bluetooth is a wireless technology standard for exchanging data over short distances. Zigbee is a specification for a group of communication protocols using small, low-power digital radios based on an IEEE 802 standard for personal area networks. WiDi refers to a wireless display standard developed by Intel.

An example of an IWS sources is a wireless access point (WAP), which allows access to a wired network using WiFi, Bluetooth, Zigbee, or other such wireless communication standards. The IWS sources are called ambient herein because they may be detected or "observed" in the environment by the mobile device. The IWS sources are called "identifiable" because each is uniquely identifiable. For example, each WAP may be uniquely identified by its basic service set identification (BSSID) or media access card (MAC) address. Of course, other identifying characteristics may be used alone or in combination with each other or with the BSSID or MAC address. Examples of such other identifying characteristics include service set identification (SSID) and received signal strength indication (RSSI).

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "computer-readable media" includes computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., RAM and ROM).

The invention claimed is:

1. A mobile device comprising:
a location estimator configured to estimate a present location of the mobile device;
a signal-fingerprint manager configured to determine one or more signal fingerprints about the mobile device at that present location, wherein the determined one or more signal fingerprints are based at least in part upon a signal strength and a corresponding identification of one or more ambient identifiable wireless signal (IWS) sources;
a location manager configured to associate the estimated location with the determined one or more signal fingerprints;
a communications unit configured to send the association between the estimated location and the determined one or more signal fingerprints to a remote location-fingerprint database.

2. A mobile device as recited by claim 1, wherein:
the communications unit is further configured to receive a request from network server to map the present location;
the location manager is further configured to trigger the location estimator to estimate, the signal-fingerprint manager to determine, the location manager to associate, and the communications unit to send.

3. A mobile device as recited by claim 1, wherein the location manager is further configured to:
detect a change of present location of the mobile device;
determine whether to trigger contribution based, at least in part, upon the detecting of a change of present location;
in response to the trigger determination, trigger the location estimator to estimate, the signal-fingerprint manager to determine, the location manager to associate, and the communications unit to send.

4. A mobile device as recited by claim 1, wherein the corresponding identification of the one or more ambient identifiable wireless signal (IWS) sources includes one of a media access card MAC address or a basic service set identification (BSSID).

5. A mobile device as recited by claim 1, wherein the signal fingerprints are WiFi fingerprints.

6. A mobile device as recited by claim 1, wherein the estimated location is a geo-location.

7. A mobile device as recited by claim 1, wherein the present location is estimated, at least in part, by a global positioning system (GPS).

8. A mobile device as recited by claim 1, wherein the mobile devices are wireless devices selected from a group consisting of a smartphone, a tablet computer, a feature phone, a personal digital assistant (PDA), a wireless-enabled wearable device, a laptop computer, netbook computer, handheld device, handset, and portable computer.

9. One or more non-transitory computer-readable media with processor-executable instructions stored thereon which when executed by one or more processors cause performance of operations comprising:
estimating a present location of a mobile device;
determining one or more signal fingerprints about the mobile device at that present location, wherein the determined one or more signal fingerprints are based at least in part upon a signal strength and a corresponding identification of one or more ambient identifiable wireless signal (IWS) sources;
associating the estimated location with the determined one or more signal fingerprints;
sending the association between the estimated location and the determined one or more signal fingerprints to a remote location-fingerprint database.

10. One or more non-transitory computer-readable media as recited by claim 9 further comprising
detecting a change of present location of the mobile device;

determining whether to trigger contribution based, at least in part, upon the detecting of a change of present location;

in response to the trigger determination, triggering the estimating, determining, associating, and sending operations as recited by claim 9.

11. One or more non-transitory computer-readable media as recited by claim 9, wherein the determining includes observing the one or more ambient identifiable wireless signal (IWS) sources.

12. One or more non-transitory computer-readable media as recited by claim 11, wherein the corresponding identification of the one or more ambient identifiable wireless signal (IWS) sources includes one of a media access card MAC address or a basic service set identification (BSSID).

13. One or more non-transitory computer-readable media as recited by claim 9, wherein the signal fingerprints are WiFi fingerprints.

14. One or more non-transitory computer-readable media as recited by claim 9, wherein the estimated location is a geo-location.

15. One or more non-transitory computer-readable media as recited by claim 9, wherein the present location is estimated, at least in part, by a global positioning system (GPS).

16. One or more non-transitory computer-readable media as recited by claim 9, wherein the mobile devices are wireless devices selected from a group consisting of a smartphone, a tablet computer, a feature phone, a personal digital assistant (PDA), a wireless-enabled wearable device, a laptop computer, netbook computer, handheld device, handset, and portable computer.

* * * * *